United States Patent [19]

Whiting

[11] Patent Number: 4,837,436

[45] Date of Patent: Jun. 6, 1989

[54] STORAGE PHOSPHOR READ-OUT METHOD

[75] Inventor: Bruce R. Whiting, Pittsford, N.Y.

[73] Assignee: Eastman Kodak Company, Rochester, N.Y.

[21] Appl. No.: 64,264

[22] Filed: Jun. 18, 1987

[51] Int. Cl.$^4$ ............... A61B 6/00; G01N 23/04; H01J 37/22

[52] U.S. Cl. ............... 250/327.2; 250/484.1

[58] Field of Search ............... 250/484.1, 327.2

[56] References Cited

U.S. PATENT DOCUMENTS

| | | | |
|---|---|---|---|
| 3,859,527 | 1/1975 | Luckey | 250/327.2 |
| 4,527,060 | 7/1985 | Suzuki et al. | 250/327.2 |
| 4,652,735 | 3/1987 | Ishikawa et al. | 250/578 |

OTHER PUBLICATIONS

Reeke, Jr., "The ROCKS System of Computer Programs for Macro-Molecular Crystallography", *Journal of Applied Crystallography, vol. 17 (1984), pp. 125-130*.

"A New Type of X-Ray Area Detector Utilizing Laser Stimulated Luminescence" by J. Miyahara et al., Nuclear Instruments and Methods in Modern Physics Research A246(1986), pp. 572-578.

*Primary Examiner*—Janice A. Howell
*Assistant Examiner*—William F. Rauchholz
*Attorney, Agent, or Firm*—Thomas H. Close

[57] ABSTRACT

A wide dynamic range read-out method for a storage phosphor sheet includes the steps of reading out the storage phosphor sheet once to produce a high exposure image detail signal, and a second time to produce a low exposure image detail signal. The image signals are combined to produce a wide dynamic range signal.

2 Claims, 1 Drawing Sheet

STORAGE PHOSPHOR READ-OUT METHOD

TECHNICAL FIELD

This invention relates to mthods of reading out radiation images from storage phosphor screens and more particularly to a method of readout of the storage phosphor screens which increases the range of image intensities which can be accurately measured.

BACKGROUND OF THE INVENTION

It is well known that the scattering of high energy radiation from a sample of material can yield information about the atomic structure of the material. Such radiation may be in the form of X-rays, gamma rays, cathode electrons, or the like. When a beam of radiation strikes a sample, a diffraction pattern of reflected radiation is created, which has a spatial intensity distribution that depends on the wavelength of the radiation and the type and position of the atoms in the material. If the sample is an oriented single crystal, the diffraction pattern consists of a pattrn of spots, corresponding to a projection of the reciprocal lattice of the crystal. Another important class of samples are randomly oriented—either polycrystalline, amorphous, or powdered—and the diffraction pattern becomes a series of cones, concentric with the incident beam. In each case, analysis of the position and intensity of the features of the diffraction pattern (spots or line segments), usually done by high speed digital computers, can reveal information about the atomic structure of the material. To achieve high quality information the location of the diffraction features must be accurately known, requiring adequate spatial resolution from the detector, and the intensity in the feature must be accurately determined. Since there is uncertainty in the statistics of the quanta contributing to a diffraction feature, accurate intensity determination requires both high enough exposures to give adequatee quatum noise and good siignal-to-noise ratio in the detector to not degrade this precision. For many diffraction pattrns it is also highly desirable to be able to gather data over as large an area as possible. The function of a diffraction detector is then to determine the posititon and the intensity of this diffraction pattern with adquate accuracy, and provide the digital data for analysis.

Photographic film is one widely used detector for diffraction patterns. When the film is directly exposed to high energy radiation, a latnt image is created proportional to the deposited energy and hence the density of the developed grains is a measurement of the radiation intensity. By measuring the optical density as a function of posititon on the exposed photographic film the diffraction pattern is recorded, and the features (spots or line segments) can be analyzed to reveal information about atomic details of the sample. While directly exposed film has very good spatial resolution and can record large areas, it suffers several drawbacks. Because film does not absorb all the X-ray quanta inciden ton it and because it has a relatively high background noise in the form of chemical fog, film is a slow or insensitive detector, i.e., high doses of radiation must be given the sample to get a readable image. The use of intensifying screens to speed up film systems has been atteempted, but it becomes difficult ot maintain intensity calibration with such screens. Film has a limited range of density linearity versus exposure, typically less than two orders of magnitude, so that widely differing intensities cannot be measured on the same piece of film. Often multiple films are used in a pack, with each film receiving a different exposure range, but the merging of the data from various films is tedious. Also, film must be processed with wet chemistry, an inconvenience. Finally, to utilize computers to analyze the data, the film must be scanned with a densitomter to convert densities to digital data, a time consuming intermediate step.

Various electronic detectors have been used to measure diffraction patterns, such as charge coupled devices, wire proportional counters, scintillators and the like. Such detectors efficiently absorb radiation quanta and have little noise, so they can be more sensitive than film, and product digital electronic data directly. However, they usually have a limited intensity range due to signal saturation or counting ratee limitations, which limits the simultaneous recording of strong and weak intensities. Also, electronic detectors have limited size so they can cover only a small area at one time. To form a complete scan the electronic detector must be moved until it has sequentially covered the entire area of a diffraction pattern resulting in additional exposure time. Recently, position sensitive detectors, which measure the position of quanta along a line instead of at a point, have been employed, but they also must be moved to cover an entire area. True area electronic detectors produced to data have not had enough active elements to be useful, either because of their small area (CCD or photodiode arrays) or poor resolution (wire grid detectors or image intensifiers). Thus electronic detectors suffer speed limitations because of their relative size and counting rate limits, and tend to have limited exposure latitude.

Given the limitations of current technologies, acquiring accurate data can often take long periods of time because of the need for high exposures, sometimes many hours or even days. More intense sources have been used to shorten this time, e.g., synchtrotron X-ray beams, but with high exposures there is often the danger of sample degradation due to radiation damage. It is thus very desirable to have detectrs which efficiently utilize all available quanta with little added noise.

One promising technology for recording radiation images is based on stimulable storage phosphors. As is revealed in U.S. Pat. No. 3,859,527 to Luckey, when certain types of phosphors are exposed to high energy radiation, such as X-rays, cathode rays, etc., they store a portion of the energy of the incident radiation. If the phosphor exposed to radiation is then exposed to a stimulating radiation, such as visible light or heat, the phosphor will emit radiation inproportion to the stored energy of the high energy radiation. Screens formed form such storage phosphors have been discussed inthe literature (J. Miyahara, et a., "A New Type of X-ray Area Detector Utilizing Laser Stimulated Luminescence" Nuclear Instruments and Methods in Modern Physics Research A246 (1986) 572578) as having very desirable properties, in terms of sensitivity and exposure latitude, for the detection of X-ray diffraction patterns from single crystal biological samples. Because storage phosphor screens efficiently absorb incident quanta and have very low background noise, hey are 10–50 times more sensitive than photographic film. They have resolutions on the order of 0.1 mm and can be made in large area formats, with millions of effective elements over a large area simultaneously integrating intensities, with no counting rate limitations. The stimulated signal is linearly related to radiation exposure over at least 5 orders of magnitude. However, it is difficult tto design analog electronics which can handle signals over such a wide range without degradation, and likewise analog-to-digital converters do not typically cover such a large signal variation. Analog compression schemes, such as logarithmic amplifiers, tend to have speed and gain limitations. Thus, while storage phosphor sysems are inherently ideally suited for diffraction intensity, it is challenging to design economical electronic systems which do not degrade the available signal.

There has been much development effort on storage phosphor systems for application in projection radiography. One of the known techniques is the use of a preliminary scan at low stimulating intensity to determine the exposure level of the latentimage on the storage phosphor screen. See U.S. Pat. No. 4,527,060 issued July 2, 1985 to Suzuki et al. Here a small percentage of the latent image is read by a low power stimulating beam, and this information is ued to optimally set the grain or scaling factor of the electronics for a full intensity final scan, insuring that no information is lost due to too high an exposure or inadequate gain. Thus it is known that multiple scans of an exposed storage phosphor screen can be used to optimally set the electronic gain in the system for a final scan.

SUMMARY OF THE INVENTION

The primary object of the present invention is to provide a method for reading out wide dynamic range images from a storage phosphor. This method is accomplished by making multiple scans of the exposed phosphor screen at different stitmulating exposure levels, andcombining the image signal from each scan into a final image signal covering a wider dynamic range than could be obtained by a single reading.

In a preferred practice of the method, a first read-out is conducted with low intensity stimulating radiation to produce a first image signal bearing information regarding high exposure image detail; a second read-out is conducted with high intensity stimulating radiation to produce a second image signal bearing information regarding low exposure image detail; and the first and second image signals are combined to form an image signal bearing information regarding a wide dynamic range of image detail.

DETAILED DESCRIPTION OF THE INVENTION

Figure 1:
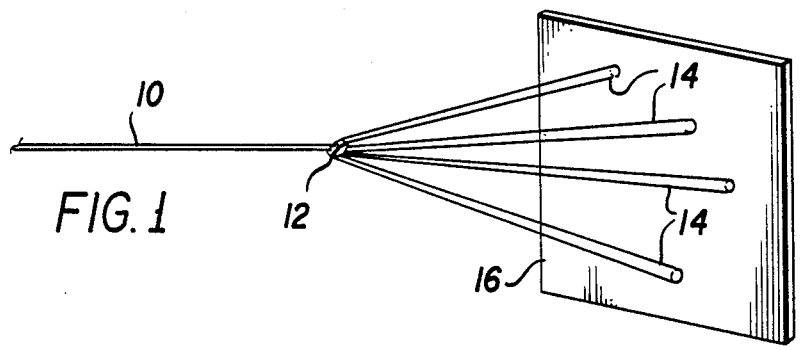
FIG. 1 is a schematic diagram showing a typical exposure situation with beam, sample and detection screen.

The present invention will be described in further detail with reference to the accompanying drawings. To fully utilize the capability of the storage phosphor screen for diffraction pattern detection, care must be taken in the preparation of the sceen and the exposure process. The screen must have residual latent siganls which are much lower in srength than the weakest diffraction feature to be measured. This is accomplished by erasing the screen with energy (heat or light or other means) to a residual level which is sufficiently low. The storage phosphor screen is exposed in an apparatus shown schematically in FIG. 1, where a radiation source (not shown) supplies a beam of energy (e.g. X-rays, electrons) 10 onto a sample of material 12, and the diffracted beams 14 are made to intercept the surface of the storage phosphor screen 16. Care should be taken to minimize background radiation, scatteer, etc. The screen 16 can be shaped into various forms for most efficiently collecting the diffracteed pattern, for instance, flat plates, cylinders, etc.

Figure 2:
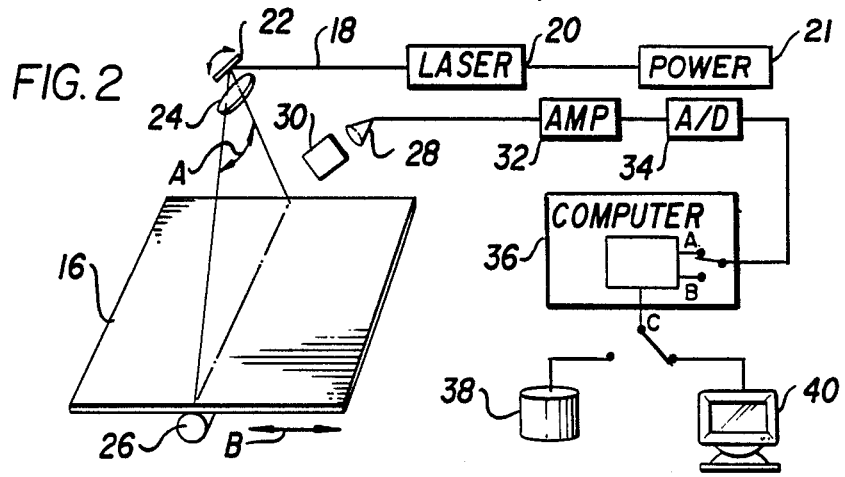
FIG. 2 is a schematic diagram showing a readout scanner and signal processing apparatus for practicing the method of the present invention.

After exposure the screen will have a latent image which can be read-outas schematically illustrated in FIG. 2, where for simplicity a flat plat scanner is shown. A beam 18 of stimulating radiation is generated, for instance from a laser source 20, and deflector 22 is used to scan the beam 18, which has been focussed by appropriate optics 24, point by point across the screen 16 as indicated by arrow A. A translation mechanism 26 moves the screen in a direction indicated by arrow B perpendicular to the travel of the deflected beam, allowing a raster scan of the screen surface. The inensity of the stimulated fluoroescence is detected by an electro-optic converter whichis sensitive at the wavelength o the stimulated light, for instance a photomultiplier tube 28 which receives light through an optical filter 30 which blocks stimulating wavelengths but passes the stimulated light. The signal from the photoconverter is electronically amplified and filtered by amplifier 32, and converted to a digital signal by an analog-to-digital (A/D) converter 34. The signal is processed in a digital computer 36, and stored on a storage medium, such as a magnetic tape or disc 38 or displayed on a display means such as a CRT 40 or a film printer. To maintain the wide latitude and signal quality of the storage phosphor signal puts great demands on the electronic processing chain, in particular he A/D converter 34. For example, to handle a range of 17-bit bit A/D converter. Such high performance deices are expensive and difficult to maintain. 8-bit or 12-bit A/D converters are now common, however, providing a range of 256 or 4096, respectively.

Figure 3:
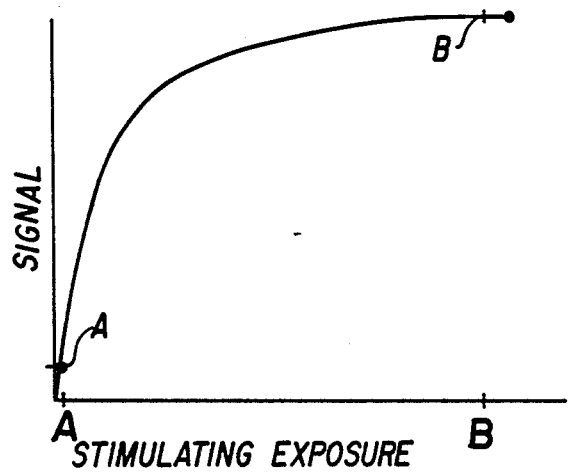
FIG. 3 is a representative plot of signal strength versus laser stimulating power useful in describing the present invention.

The intensity of the stimualted light depends linearly on the amount of high energy radiation absorbed in the storage phosphor screen 16 and also on the amount of stimulating energy delivered to the screen. At low stimulating exposures, stimulated light increases linearly with stimulating exposure (=power×time/unit element), but at higher stimulating exposures, saturation is reached as all the stored energy is read-out. This is illustrated in FIG. 3 which is a qualitative graph of signal vs. stimulating exposure. The stimulatingg exposure to the screen can be controlled and reduced in many ways, e.g., lowering the beam power, increasing the beam scanning velocity, etc. In general, the more signal thatcan be read-ut, the betterthe noise characteristics. If low stimulating exposures are used such that only a small fraction of the deposited energy is released (point A in FIG. 3), low signal levels are generated, and only the most highly exposed detail regions of the image will provide a usesable signal. If high stimulating exposures are used (point B on FIG. 3), the highly exposed regions of the image will be vvery strong and off scale, but he weakly exposed regions can be optimally recovered and digitized.

According to the preferred mode of practicing the present invention, two scans of the image are performed, one at low stimulating intensity to produce a signal A having useful information represting the high exposure range of image detail and one at a high stimulating intensity to produce a signal B having useful information representing the low exposure range of image detail. The useful information from both signals is combined into one signal C having information representing a very wide range of exposure and good signal quality. The combination of the signals is performed in computer 36, as shown schematically in FIG. 2. This result is achieved with electronic components (output amplifiers and A/D converers) having only modest performance characteristics. If the rattio of signal levels between the high and low stimulating intensities is S, then the range of an N-bit A/D converter can be extended by ln(S)ln(2). Ultimately, the limits to the range of useful output signals will be set by the noise level of the exposure, which is a function of radiation exposure levels.

As an example, a lysozyme protein crystal was exposed to a synchrotron X-ray source for one second (about 1/10 the exposure required for photographic film) and the difraction pattern was collected on a flat storage phosphor scree of the type discussed in the Miyahara article cited above. The screen was scanned with a beam from an infrared laser that was 1/100 of the full laser power, (by adjusting power supply 21) followed by a scan at full laser power, resulting in a ratio of signal strngths between the two scans of 19/1. The two resulting signals were digitized with a 12-bit A/D converter, giving a dynamic range of 4096 to 1 for each signal. The diffraction pattern spots were detected by processing each signal with a peak detector which averaged the signals over 0.6 square millimetres (about 60 pixels), and subtracted off a background determined by an equal area surrounding the 0.6 mm square.

The results of the measurements are shown in table 1 below where code values for the integrated peak intensities of detected spots are shown. In the signal resulting from the high intensity stimulation the lowest exposure spots had peak amplitude about three times the standard deviation of the background and were well resolved, but the high exposure spots were off scale and not resolved. For the low intensity stimulation scan, the high exposure spots were easily resolved. Because of poor signal to noise ratio, the low exposure spots had a large uncertainty in value, but it was estimated that the ratio of the high est exposure spot detected with low intensity stimulation to the lowest exposure spot detected with high intensity stimulation was about 20679×19/177=2200 (a dynamic range of 65 db compared with a dynmic range of about 40 db for conventional film). All the spots were well resolved, even though only a 12-bit A/D converter was used.

TABLE I

| SPOT EXPOSURE | LOW INTENSITY STIMULATION | HIGH INTENSITY STIMULATION |
| --- | --- | --- |
| Low | Not Visible | 177 ± 81 |
| Moderate | 1089 ± 17 | 21,047 ± 95 |
| High | 20,679 ± 35 | Off Scale |

Although the two signals in the example above were examined and manually combined by the inventor to produce the resulting wide dynamic range image signal, software packages such as ROCKS described in the article "The ROCKS System of Computer Programs or Macro-Molecular Crystallography" by G. N. Reek Jr., Journal of Appl. Cryst. Vol. 17, pg 125–130 m 1984 are available which automatically perform X-ray crystallography from scanned signals generated from the conventional multipack X-ray films discussed above. The multipack films contain low sensitivity films, which when developed and scanned produce an image signal analogous to the low intensity scan of he storage phosphor according to the present invention and higher sensitivity films, which when developed and scanned produce an image signal analogous to the high intensity scan of the storage phosphor according to the present invention. Such programs are readily adapted for use with the method of the present invntion to combine the two image signals to produce the wide dynamic range X-ray diffraction image. In general, such programs operate by identifying and correlating the moderately exposed spots in both of the image signals, then detecting and adding the high low exposure spots from the high sensitivity fiflm to the moderately exposed spots from both films to generate the final X-ray diffraction image that is employed for analysis.

The presently preferred mode for practicing the present invention, as described above, involves the steps of scanning a storage phosphor first with low intensity stimulation to generate an image signal having information related to high exposure spots. Alternatively, the order of scanning intensities may be reversed, first scanning the storage phosphor with higher intensity stimulating radiation to generate the signal having information regarding low intensity spots, and the scanning with lower intensity stimulating radiation to generate the signal having information on high exposure spots.

According to a further alternative mode of practicing the invention, two or more successive scans using intermediate intensity stimulating radiation are performed, with the gain of amplifier 32 adjusted to a low gain for one of the scans to produce a signal having information on high exposure spos, and adjusted to a high gain or another one of the scans to produce a signal having information on low exposure spots.

Furthermore, although the invention has been described in the context of gnerating a wide dynamic range image signal for X-ray diffraction crystallography, the method of the present invention could also be applied to projection radiography such as industrial non-destructive testing.

INDUSTRIAL APPLICABILITY AND ADVANTAGES

The wide dynamic range radiation readout method according to the present invention is useful in the field of diffraction and projection radiation imaging of the type wherein a wide dynamic range image is produced, such as X-ray crystallography, and industrial projection radiography for non-destructive testing. The method has the advantage of providing a wide dynamic range image signal using conventional limited dynamic range image signal detection and processing hardware, thereby effecting improvements in apparatus cost, complexity reliability, and performance.

I claim:

1. A wide dynamic range radiation read-out method for a storage phosphor sheet which has been subjected to image-wise radiation to form a stored image therein, and the image being read-out by exposure to stimulating radiation to release stimulated radiation in the pattern of said stored image, said stimulated radiation being photoelectrically detected by a sensor having a dynamic range sensing capability less than the dynamic range of the image to produce an image signal, said wide dynamic range read-out method comprising the steps of:

a. conducting one read-out with low intensity stimulating radiation to produce a first image signal having information representing high exposure image detail;

b. conducting another read-out with high intensity stimulating radiation to produce a second image signal having information representing low exposure image detail and lacking some information representing the high exposure image detail; and c. combining said image signals to form a wide dynamic range image signal having information representing low and high exposure image detail.

2. The method claimed in claim 1, wherein said image is an X-ray crystal diffraction spot pattern, and said step of combining said image signals includes the steps of:

a. detecting high exposure spots represented in said first signal;

b. detecting low exposure spots represented in said second signal; and c. combining said low, and high exposure spots to form said wide dynamic range image signal.

* * * * *